(12) United States Patent
Desgranges et al.

(10) Patent No.: US 8,884,959 B2
(45) Date of Patent: Nov. 11, 2014

(54) GRADIENT FREE SHADING FOR VOLUME RENDERING USING SHADOW INFORMATION

(75) Inventors: Philippe Desgranges, Pariset (FR); Klaus Engel, Donauwoerth (DE)

(73) Assignee: Siemens Aktiengesellschaft, Munich (DE)

( * ) Notice: Subject to any disclaimer, the term of this patent is extended or adjusted under 35 U.S.C. 154(b) by 1731 days.

(21) Appl. No.: 11/419,017

(22) Filed: May 18, 2006

(65) Prior Publication Data

US 2007/0002047 A1 Jan. 4, 2007

Related U.S. Application Data

(60) Provisional application No. 60/687,642, filed on Jun. 3, 2005.

(51) Int. Cl.
G06T 15/50 (2011.01)
G06T 15/00 (2011.01)
G06T 15/60 (2006.01)

(52) U.S. Cl.
CPC ...................................... *G06T 15/60* (2013.01)
USPC .......................................... 345/426; 345/419

(58) Field of Classification Search
USPC ................... 345/426, 419; 382/257
See application file for complete search history.

(56) References Cited

U.S. PATENT DOCUMENTS

| | | | | |
|---|---|---|---|---|
| 5,870,097 A * | 2/1999 | Snyder et al. | ................. | 345/426 |
| 5,896,135 A * | 4/1999 | Yang | ............................ | 345/427 |
| 6,252,608 B1 * | 6/2001 | Snyder et al. | ................. | 345/473 |
| 6,567,083 B1 * | 5/2003 | Baum et al. | .................... | 345/426 |
| 6,593,923 B1 * | 7/2003 | Donovan et al. | .............. | 345/422 |
| 6,593,925 B1 | 7/2003 | Hakura et al. | | |
| 7,038,678 B2 * | 5/2006 | Bunnell | ........................ | 345/426 |
| 7,106,325 B2 * | 9/2006 | Ritter et al. | .................... | 345/426 |
| 2002/0018063 A1 * | 2/2002 | Donovan et al. | .............. | 345/426 |
| 2004/0233195 A1 * | 11/2004 | Bunnell | ........................ | 345/426 |
| 2006/0071932 A1 * | 4/2006 | Weese et al. | .................. | 345/424 |

OTHER PUBLICATIONS

Behrens, U. and Ratering, R. 1998. Adding shadows to a texture-based volume renderer. In Proceedings of the 1998 IEEE Symposium on Volume Visualization (Research Triangle Park, North Carolina, United States, Oct. 19-20, 1998). VVS '98. ACM, New York, NY, 39-46.*

Engel, Klaus et al.: "High-Quality Pre-Integrated Volume Rendering Using Hardware-Accelerated Pixel Shading:" 2001; Proceedings of the ACM SIGGRAPH/EUROGRAPHICS workshop on Graphics; pp. 9-16.*

Fernando, R., Fernandez, S., Bala, K., and Greenberg, D. P. 2001. Adaptive shadow maps. In Proceedings of the 28th Annual Conference on Computer Graphics and interactive Techniques SIGGRAPH '01. ACM, New York, NY, 387-390.*

(Continued)

*Primary Examiner* — Ulka Chauhan
*Assistant Examiner* — Roberta D Prendergast

(57) ABSTRACT

Disclosed is a method and apparatus for computing the shading of a volume. A slice of the volume is rendered along a half-angle direction that is between a light direction and a view direction. A slice of the volume is then rendered along a light direction to assimilate shadow information of the slice in a shadow buffer. The shadow buffer is bled orthogonal to the light direction to shade the slice.

19 Claims, 14 Drawing Sheets

(56) References Cited

OTHER PUBLICATIONS

Hao, X. and Varshney, A. 2004. Real-time rendering of translucent meshes. ACM Trans. Graph. 23, 2 (Apr. 2004), 120-142.*

Kniss, J., Kindlmann, G., and Hansen, C. 2002. Multidimensional Transfer Functions for Interactive Volume Rendering. IEEE Transactions on Visualization and Computer Graphics 8, 3 (Jul. 2002), 270-285.*

Lokovic, T. and Veach, E. 2000. Deep shadow maps. In Proceedings of the 27th Annual Conference on Computer Graphics and interactive Techniques International Conference on Computer Graphics and Interactive Techniques. ACM Press/Addison-Wesley Publishing Co., New York, NY, 385-392.*

Soler, C. and Sillion, F. X. 1998, "Fast calculation of soft shadow textures using convolution", Proceedings of the 25th Annual Conference on Computer Graphics and interactive Techniques SIGGRAPH '98, ACM, New York, NY, pp. 321-332.*

Stamminger, M. and Drettakis, G. 2002. Perspective shadow maps. In Proceedings of the 29th Annual Conference on Computer Graphics and interactive Techniques (San Antonio, Texas, Jul. 23-26, 2002). SIGGRAPH '02. ACM, New York, NY, 557-562.*

Zhang, C. And Crawfis, R. 2002. Volumetric shadows using splatting. In Proceedings of the Conference on Visualization '02 (Boston, Massachusetts, Oct. 27-Nov. 1, 2002). Visualization IEEE Computer Society, Washington, DC, 85-92.*

Nedel et al., "Computer Graphics & Medicine", SIBGRAPI'99, Campinas, Oct. 1999, pp. 1-146.

Kniss, J. et al., "A Model for Volume Lighting and Modeling," IEEE Transactions on Visualization and Computer Graphics, vol. XX No. 6 (2003).

Kniss, J. et al., "Interactive Translucent Volume Rendering and Procedural Modeling," Proc. of the Conference on Visualization, IEEE Computer Society pp. 109-116 (2002).

* cited by examiner

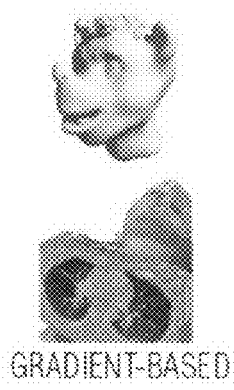
FIG. 9A GRADIENT-BASED
FIG. 9B DILATION
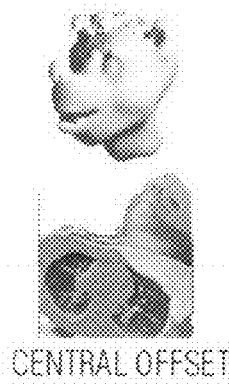
FIG. 9C CENTRAL OFFSET
FIG. 9D SCALING

```
// Pixel shader code file uniform float falloff = 0.05;
uniform float offset = 0.0075;

(...)

vec2 CentralOffset (vec2 SampleCoord)          ← STEP 1304

// computes the offset direction
    vec2 offsetDir = vec2 (0.5, 0.5) - SampleCoord;
    // computes distance to center
    float offsetLen = length (offsetDir);          ← STEP 1308 float translation = offset;

// removes artifact in the middle          ← STEP 1312
    if (offsetLen < falloff)
        translation *= (offsetLen / falloff);
                                                   ← STEP 1316
    // performs the translated lookup
    return SampleCoord + (offsetDir / offsetLen) * translation;
```

FIG. 13

GRADIENT FREE SHADING FOR VOLUME RENDERING USING SHADOW INFORMATION

This application claims the benefit of U.S. Provisional Application No. 60/687,642 filed Jun. 3, 2005, which is incorporated herein by reference.

BACKGROUND OF THE INVENTION

The present invention relates to volume rendering, and more particularly to the realistic rendering of volumetric datasets with realistic shading and shadows.

Direct volume rendering (DVR) is a method for obtaining a 2 dimensional (2D) image of a 3 dimensional (3D) dataset. Unlike many other techniques, the DVR technique enables all of the data in the dataset to contribute to the 2D output image.

Volume rendering is often described as direct rendering because it directly maps sample points from the volume to a viewplane via some optical model and a transfer function that controls the extent to which the data values are transparent (or opaque). A variety of DVR methods exist, but most are based around the idea that voxels are assigned a color and a transparency mask. This transparency means that obscured voxels may still contribute to the final image, and it is this mechanism that allows DVR to display an entire 3D dataset, including the internals of an image. An advantage of DVR is that DVR has the potential to directly visualize the complete dataset, in 3D, and with the internals of the 3D image at least partially exposed.

DVR images may be fuzzy and/or blurry because the images are generated by considering many points in the dataset and merging them. As such, DVR images are not particularly suited where crisp images are required to study fine detail. The underlying principle of DVR is sampling the volume dataset along rays in an arbitrary direction and blending these samples together. Before being blended, the densities read in the volume are converted to colors with a transfer function that is often encoded as a lookup table. When a sufficient number of samples are involved, the result is often a seamless image.

There are techniques for obtaining shadows at an interactive rate (i.e., several frames per second) but using the shadows in conjunction with shading cumulates the computational overhead of both techniques. To perform volume rendering with shadows, a commonly used method is to accumulate the light attenuation of each slice of the volume in an off-screen shadow map. A shadow map generates shadows as if light emanated from a point light source.

After the rendering of each slice into a framebuffer, it is rendered a second time into the shadow map with a shader that accumulates the light attenuation. A framebuffer refers to the memory dedicated to storing the image. Generally, the framebuffer is a 2 dimensional (2D) array of pixels, where each pixel stores a color.

At a given time in the rendering process, the shadow map contains the attenuation of the already drawn part of the object seen from the light point of view. The content of the shadow map is used as the shadow information for the subsequent slice rendered into the framebuffer using projective mapping. This process is repeated iteratively for each slice.

In classical rendering models, a distinction is made between two types of light—diffuse light that is the consequence of light striking the surface of the object directly and specular light that appears locally in areas which reflect light towards the eye of the viewer. The final pixel color depends on these two light terms that are computed independently.

The traditional approach to shading in volume rendering involves computing a local gradient per voxel using a central difference derivation. A local gradient determines the changes in a dataset locally with respect to a particular point in the volume. The Blinn-Phong lighting model is also commonly applied to each fragment on the rendered slices. The Blinn-Phong lighting model enables the approximation of shading without being too computation intensive. This gradient-based approach, however, suffers from several problems that affect performance and image quality.

Computing gradients in real-time often requires many texture fetches, causing performance to be bound by memory bandwidth. Precomputing gradients reduces the number of texture fetches but is only acceptable for small datasets because it requires a substantial amount of texture memory. This problem is compounded by the rapidly increasing size of datasets due to higher resolution scanners, putting a high premium on texture memory space. Furthermore, since gradients are calculated for all voxels, including those that do not contribute to the final image, per-voxel gradient computation is generally computationally inefficient.

Gradient-based shading tends to be very sensitive to noise, making it difficult to obtain high-quality visual results with noisy datasets, such as those from ultrasound and magnetic resonance (MR) scans. Additionally, gradients inside homogeneous regions tend to be unstable, having very low magnitudes and arbitrary directions. As such, they can produce shading artifacts along cutting plane boundaries, necessitating special consideration when rendering these regions.

Thus, there remains a need for producing realistic shaded images to achieve diffuse shading without requiring expensive gradient computation.

BRIEF SUMMARY OF THE INVENTION

In accordance with the present invention, the shading of a volume is computed. A slice of the volume is rendered along a half-angle direction that is between a light direction and a view direction. A slice of the volume is then rendered along a light direction to assimilate shadow information of the slice in a shadow buffer. The shadow buffer is bled orthogonal to the light direction to shade the slice.

In one embodiment, the bleeding of the shadow buffer includes scaling the shadow buffer. The bleeding can also include dilating the shadow buffer. Bleeding the shadow buffer can also include bleeding with a central offset. For a first pixel of the shadow buffer, bleeding with a central offset includes locating a second pixel that is closer to a center point of the shadow buffer at a given distance from the first pixel. A correction may also be performed if the second pixel is too close to the center point. In one embodiment, the first pixel is then replaced with the second pixel.

After the bleeding of the shadow buffer, the slice is rendered using the shadow map. The rendering of the slice using the shadow map includes rendering without gradients, rendering with selective specular fighting, and rendering with selective Blinn/Phong. The rendering of the slice using the shadow map can also include computing diffuse lighting with the shadow map.

These and other advantages of the invention will be apparent to those of ordinary skill in the art by reference to the following detailed description and the accompanying drawings.

BRIEF DESCRIPTION OF THE DRAWINGS

FIG. 9 shows two series of renderings performed with three different bleeding operations in accordance with an embodiment of the present invention;

FIG. 13 is a diagram of a pixel shader code file in accordance with an embodiment of the present invention.

DETAILED DESCRIPTION

Shadows in images are important visual cues for shape and composition perception. Techniques for computing shadows in volume rendering generally simulate the attenuation of light intensity traveling through a semi-transparent medium. Ray-tracing methods for computing shadows are well-known but are usually slow and unable to perform at interactive frame rates.

One previous texture-based volume rendering technique featuring shadows was based on a precomputed shadow volume principle. This shadow volume encodes for each voxel the integrated light occlusion from other voxels in regard to the light source. This precomputation is only valid for a static light position and a given object, meaning that the shadow volume has to be regenerated each time the light moves in object-space and transferred to graphics hardware. On the other hand, these techniques are often very fast when a virtual camera (generated by a computer performing these computations to generate the image and shadows) moves around the statically lit object.

Another method used for volume rendering with shadows is interlacing the shadow volume computation with the actual volume rendering, thus only requiring one slice of the shadow volume to be stored in texture memory. This technique achieves visual results that are equivalent to the results if a very high resolution shadow volume is used, though there is no large memory overhead.

The use of gradient-based shading in conjunction with shadows can produce very lifelike images, but the performance overhead of the two techniques combined often prevents rendering at interactive frame rates. On the other hand, it is well-known that some shading effects can be achieved more efficiently with certain transfer functions and that certain shadow casting techniques can generate the appearance of shading.

Figure 1:
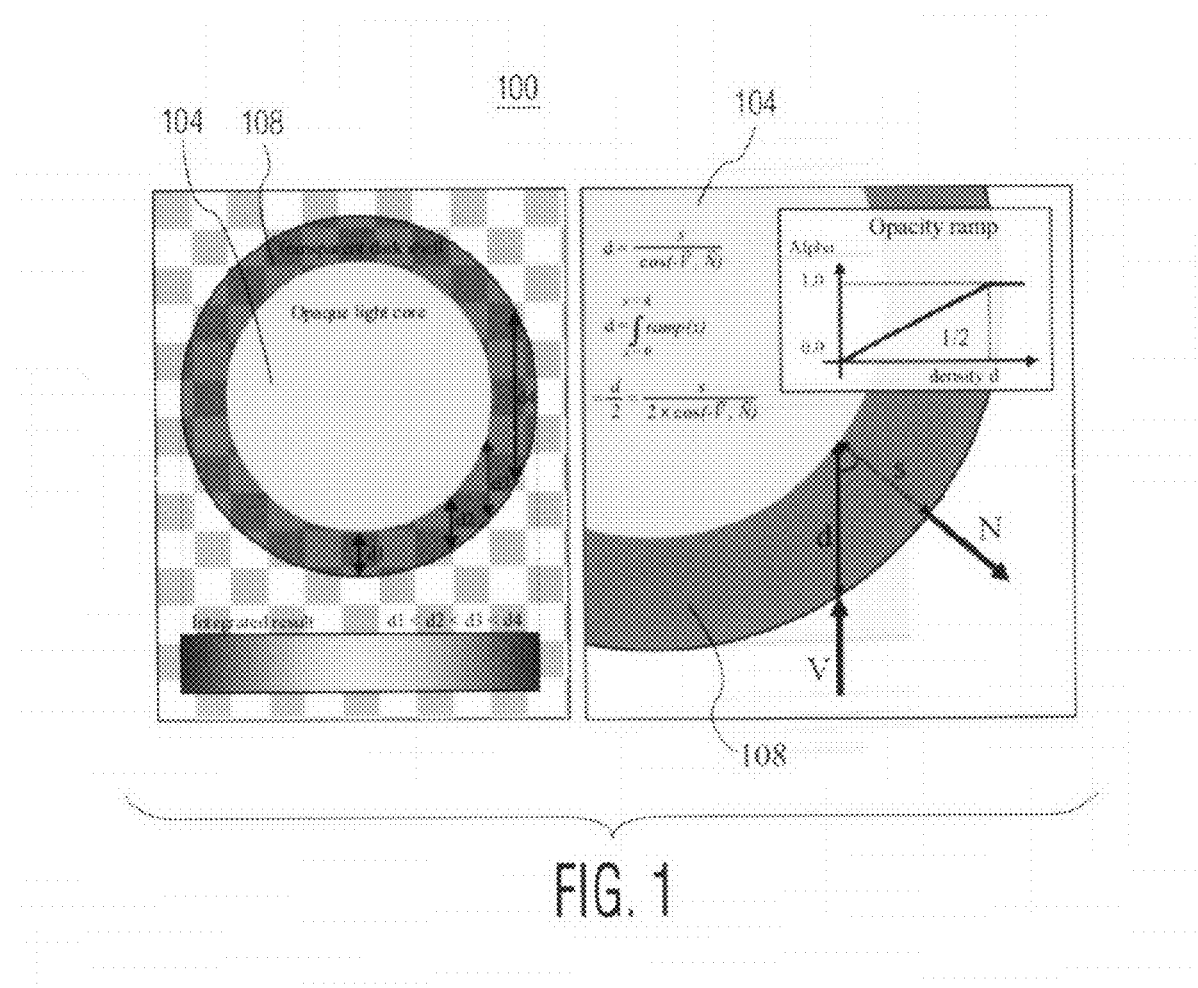
FIG. 1 is a diagram of an object illuminated with a front headlight.

FIG. 1 is a diagram 100 of an object illuminated with a front headlight (i.e., a lamp attached to an imaginary user's head so that the light shines onto the front of the object). One way of achieving a shading effect is by using a linear 1 dimensional (1D) transfer function. This transfer function is usually a linearly increasing alpha ramp with colors that are dark in the transparent areas and light in the opaque areas. An alpha ramp determines how opaque each voxel is. Because the transitions between the high and low densities are usually progressive, the objects displayed can have two distinctive components: an opaque core 104 that is usually of a light color and a transparent shell 108 that tends to be darker. For simplicity, assume that the dark outer shell 108 is of constant thickness s, and that the density (and opacity) in the shell 108 changes linearly from inside to outside.

Because the rays traverse a longer distance in the dark shell 108 near surfaces angled away from the viewpoint, more darkness is integrated into the final pixel color, resulting in darker colors for surfaces that are nearly perpendicular to the viewer. Thus, the distance d that the ray traverses in the dark shell 108 is dependent on the angle between the normal of the surface and the view vector.

FIG. 1 shows that the distance d can be calculated as the thickness of the shell 108 divided by the cosine of the angle between the view vector and the local surface normal. This cosine term can be rewritten as the L·N used in computing the diffuse lighting term from a front headlight (where N is the normal vector, L is the light vector (i.e., the direction vector from the voxel to the light source), V is the viewing direction (i.e., the direction from the camera to the volume), and L=V). Thus, d is proportional to s and inversely proportional to the diffuse lighting term (computed by Lambert's cosine law with a front headlight). Thus, integrated opacity β through the shell 108 is d/2 because of the linear alpha function. This means that the opacity of the darkness blended over the light core 104 is inversely proportional to L·N and, by extension, the brightness of the final pixel is proportional to L·N. Thus, a linear transfer function can be used as an approximation of the diffuse light contribution from a headlight.

This shading approximation, however, is not very convenient to use because the darkening is proportional to the thickness of the shell 108. This means that one can achieve smooth shading on boundaries that have a progressive density transition (for skin and soft tissue, for example), but when the transition is steep only the edges are darkened.

Figure 2:
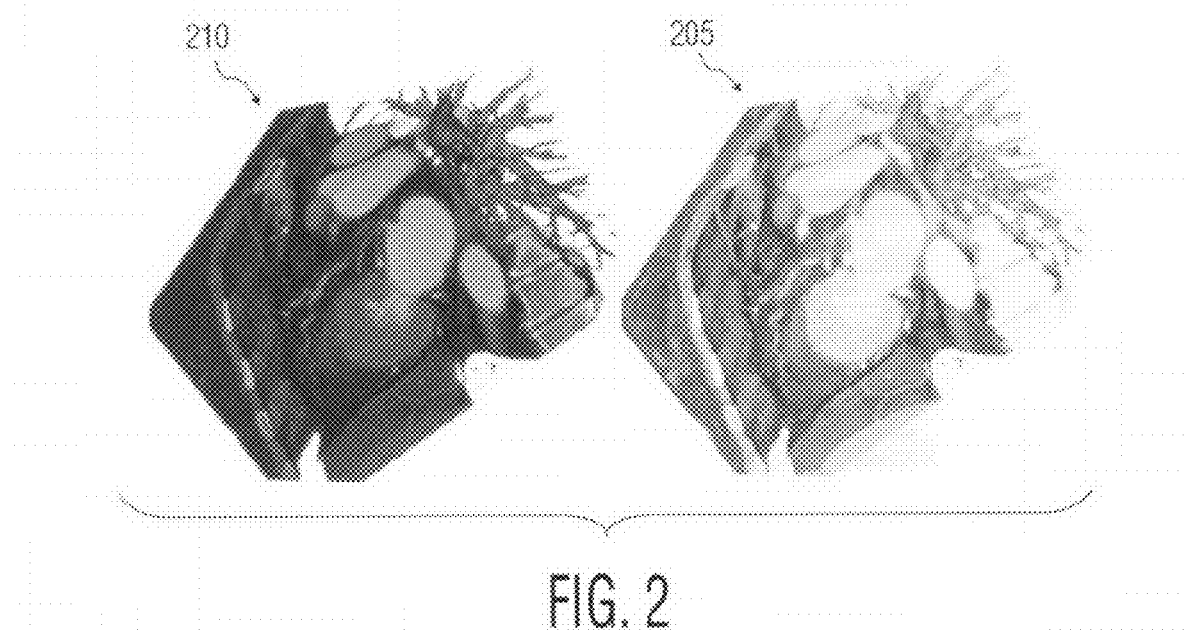
FIG. 2 shows two renderings of a heart dataset using transfer functions having different steepness.

FIG. 2 shows two renderings 205, 210 of a heart dataset using transfer functions of a different steepness. In particular, the first rendering 205 uses a transfer function having a first steepness and the second rendering 210 uses a transfer function having a lower steepness relative to the first rendering 205. The first rendering 205 is shaded lighter than the second rendering 210, and the images are permuted.

A shadow volume can be interpreted as a volume containing light attenuation factors in the range of [0.0, 1.0]. The value of each voxel is the opacity integrated along rays from the light source to the voxel, initially being 1.0 and decreasing as light is occluded. During the rendering process, the diffuse color is modulated by the attenuation factor, effectively darkening the colors in occluded areas. To some extent, the behavior of this attenuation is similar to that of the linear transfer function in areas where the light hits the transparent shell of an object. The more it penetrates the shell, the lower it becomes. The difference is that instead of being lightened toward the inside, the colors are darkened.

Figure 3:
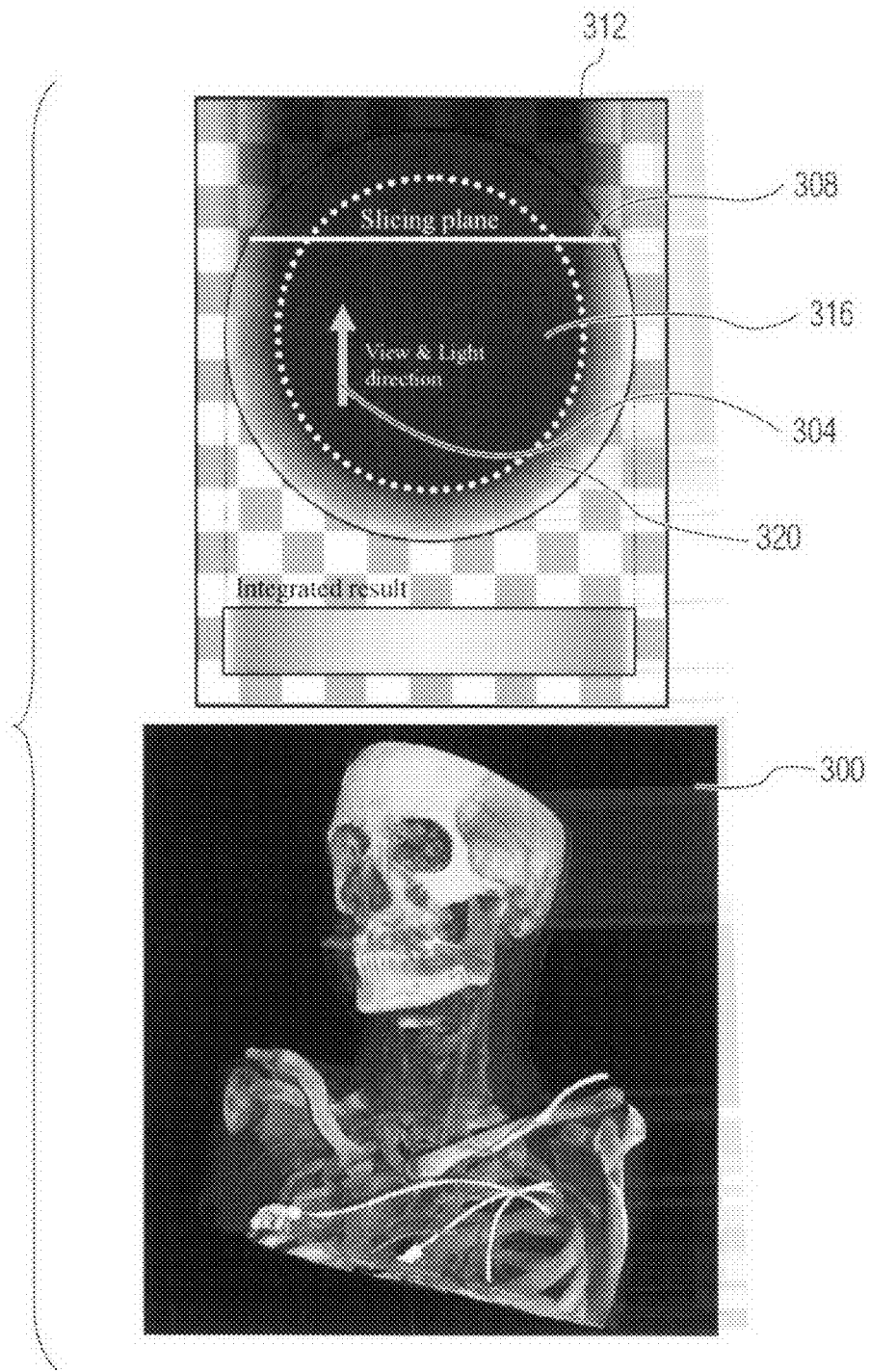
FIG. 3 shows a diagram of the upper body of a skeleton formed by having a view and light direction that is orthogonal to a slicing plane.

FIG. 3 shows a diagram of the upper body of a skeleton 300. The skeleton 300 is formed by having a view and light direction 304 that is orthogonal to a slicing plane 308. FIG. 3 shows a prior art volumetric shadow approach, as the shadow 312 stays within core 316 and not within most of the transparent shell 320.

When dealing with high resolution shadow volumes, the high attenuation areas are trapped in opaque areas and are only visible in areas where the shadow is actually cast. When high resolution shadow volumes are used with a headlight, the resulting image is very similar to an image without shadows. Note when using a directional light projected from a distance of infinity and a perspective view projection of the volume, there are slight shadows on edges visible due to the differences between the two projections.

In this case, the light direction is the same as the view direction, which means that the volume is sliced perpendicular to the viewing direction. For each drawn voxel, the corresponding shadow attenuation in the 2D shadow buffer is determined (e.g., looked up from a table) and the color is modulated by the retrieved value.

Figure 4:
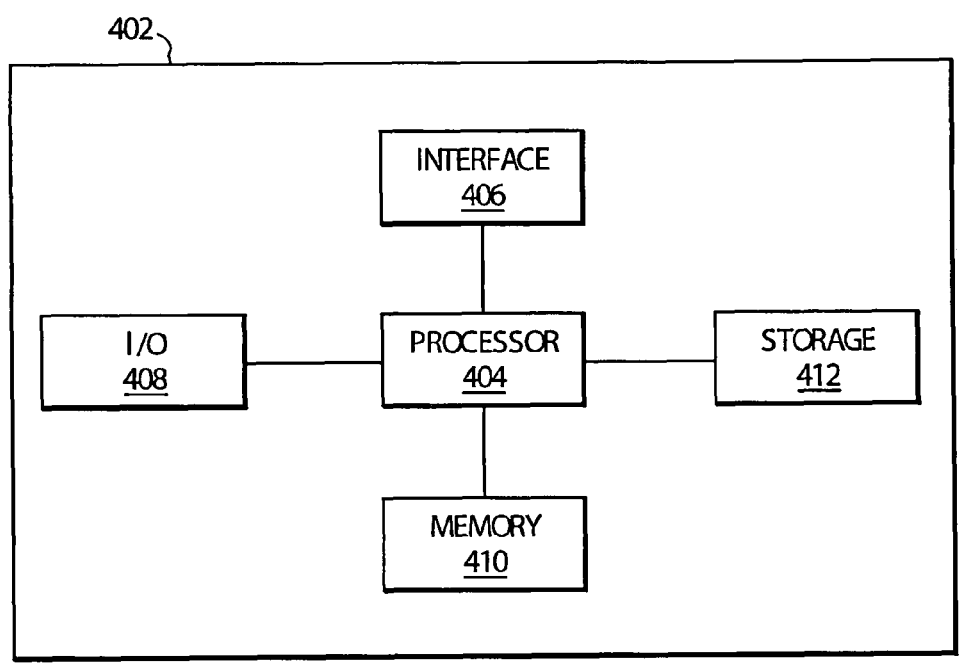
FIG. 4 shows a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 4. Computer 402 contains a processor 404 which controls the overall operation of computer 402 by executing computer program instructions which define such operation. The computer program instructions may be stored in a storage device 412 (e.g., magnetic disk) and loaded into memory 410 when execution of the computer program instructions is desired. Computer 402 also includes one or more interfaces 406 for communicating with other devices (e.g., locally or via a network). Computer 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Figure 5:
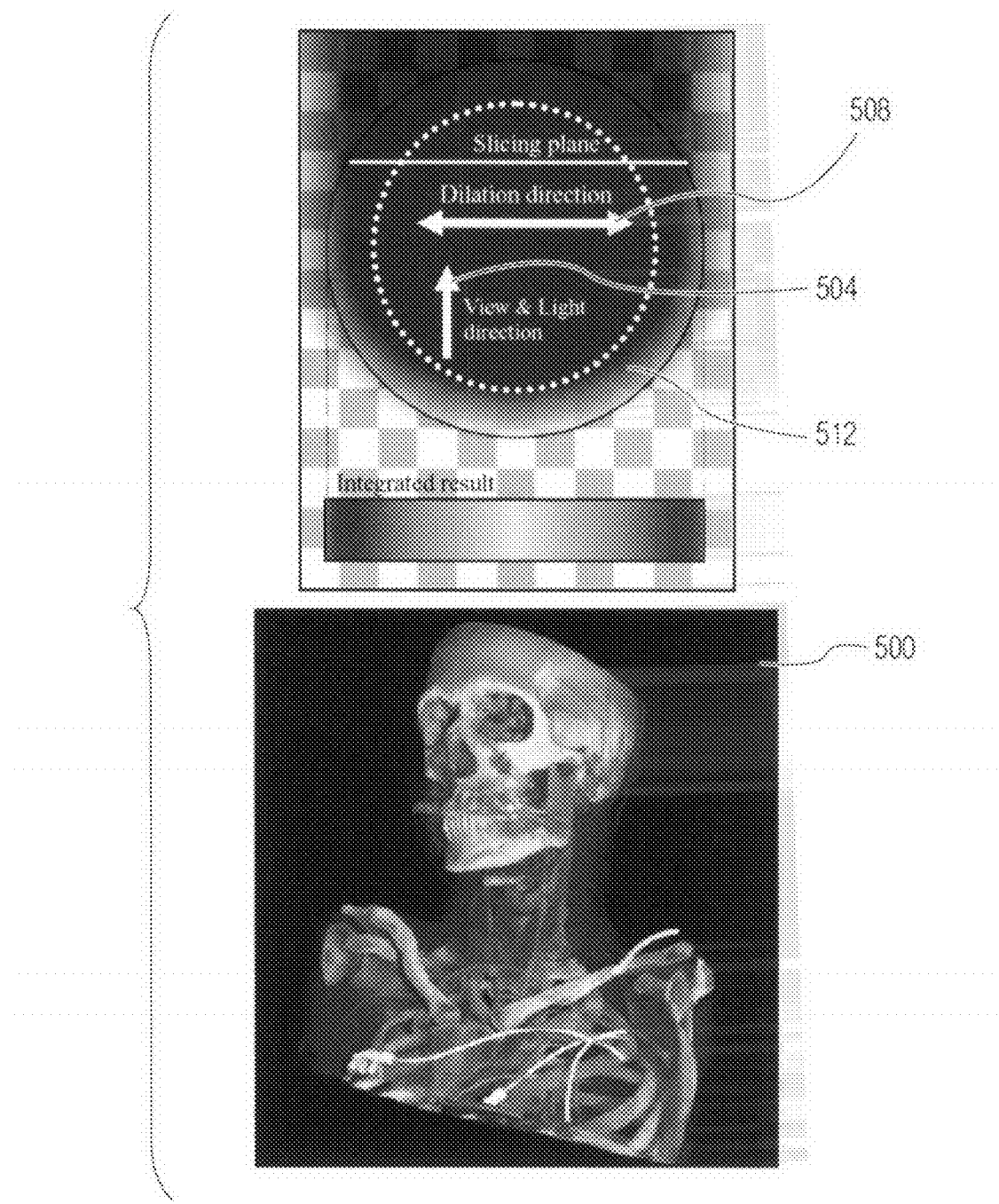
FIG. 5 shows a diagram of the upper body of another skeleton formed using a dilated version of a shadow map in accordance with an embodiment of the present invention.

FIG. 5 shows a diagram of the upper body of another skeleton 500 formed using a dilated version of the shadow map in accordance with the present invention. The view and light direction 504 is perpendicular to the dilation direction 508. Instead of using one sample of the shadow map to shade a voxel, several samples in the neighboring area are used and the minimum value is retrieved. This will extend the shadow regions and offset their boundaries toward the outside of the object where they will intersect the transparent shell of the drawn slice. This is equivalent to using a shadow volume convolved with a 3D dilation, whose kernel is a flat disk facing in the direction of the light.

Consequently, each shadow-casting voxel will darken not only the voxels behind it but also their neighbors. The more the surface faces away from the light, the more likely neighboring voxels will be in transparent shell 512. This results in a diffuse shading scheme that is similar to the one described above. This approach works independently of the colors chosen for the transfer function, only requiring that the transfer function features sufficiently smooth alpha transitions.

So far, it has been assumed that the view and the light vectors are in the same direction, so the slicing planes and the shadow buffer view are aligned. The shading technique introduced above allows arbitrary light directions by using half angle slicing. In the general case, the slicing plane is not orthogonal to the view or light vectors. However, by ensuring that the dilation is performed in all directions perpendicular to the view vector, i.e., in the light buffer texture coordinate space, the same effect can be achieved. The idea is to perform a 2D dilation with a constant dilation kernel on all lookups of the shadow map. Dilated shadow mapping can be implemented with a 5 sample kernel. Alternatively, using more samples from a disk distribution can result in a higher quality dilation. As a result of the dilation, the head of the skeleton 500 is much darker (i.e., is shaded) compared with the head of the skeleton 300 of FIG. 3.

Figure 6:
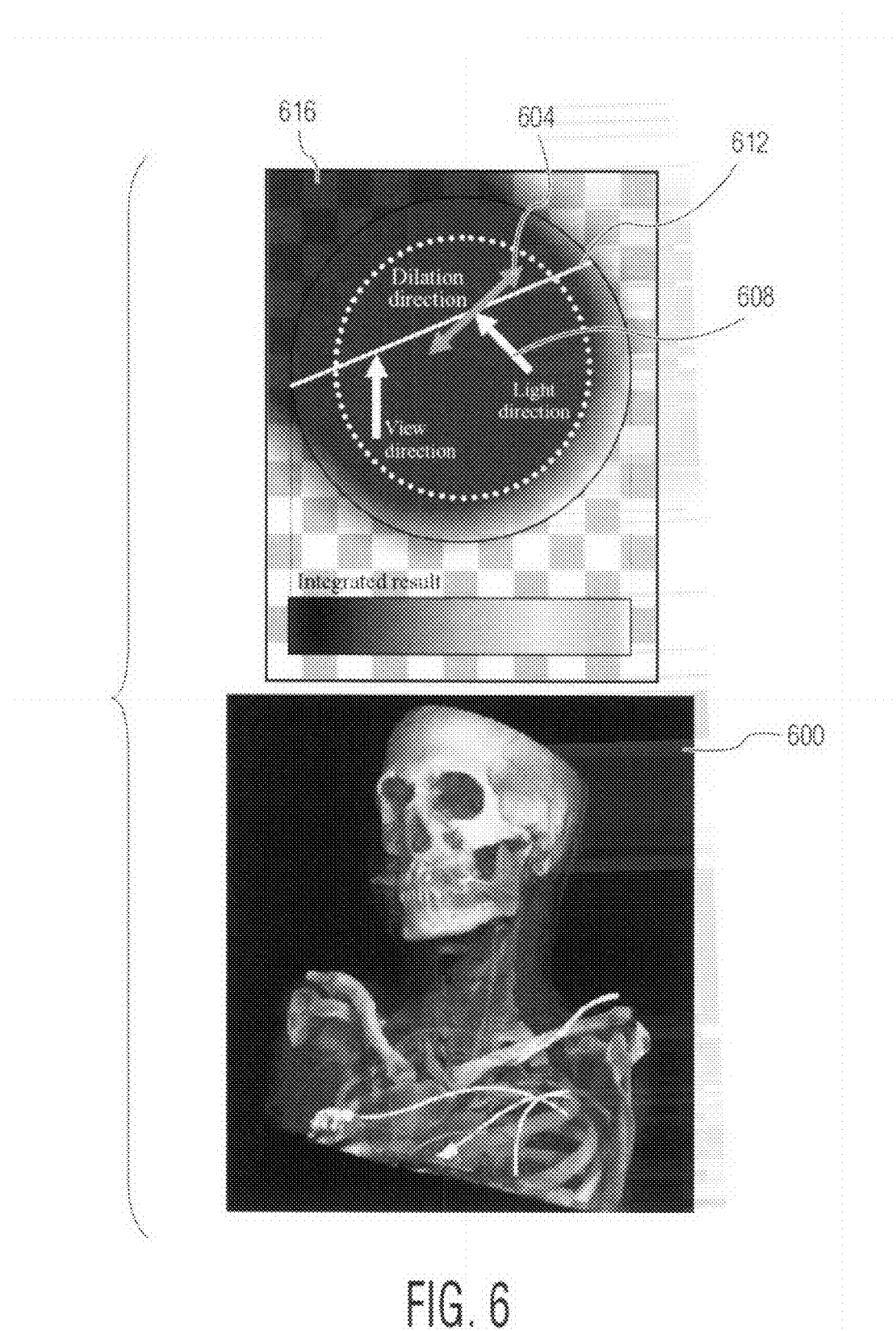
FIG. 6 shows how dilation is performed in a direction perpendicular to the light direction in accordance with an embodiment of the present invention.

FIG. 6 shows how the dilation is performed on the upper body of a skeleton 600 in a direction 604 perpendicular to the light direction 608, even if the slicing direction 612 is not orthogonal to the light vector. Specifically, FIG. 6 shows the dilation performed while enabling a light source to be positioned anywhere around the volume, rather than only as a headlight. Also, this dilation is a 2 dimensional operation.

This dilation causes the shadow 616 to bleed into surfaces turned away from the light and provides a correct diffuse shading effect with arbitrary light directions. Since this diffuse shading has been computed without any gradients, it is not affected by degenerate gradients in homogeneous regions of the data. Furthermore, it requires fewer slices than classical shading for acceptable results and compares favorably in terms of shading quality.

With respect to performance, this approach is faster than computing gradients in real time because only 2D lookups are performed while computing a local gradient typically requires six 3D lookups into the density volume (i.e., two x-axis 3D lookups, two y-axis 3D lookups, and two z-axis 3D lookups). Although only four extra 2D samples are used in our sample implementation, it can be advantageous to take six or eight samples to preserve the silhouette of cast shadows for volumes featuring high frequency detail.

Figure 7:
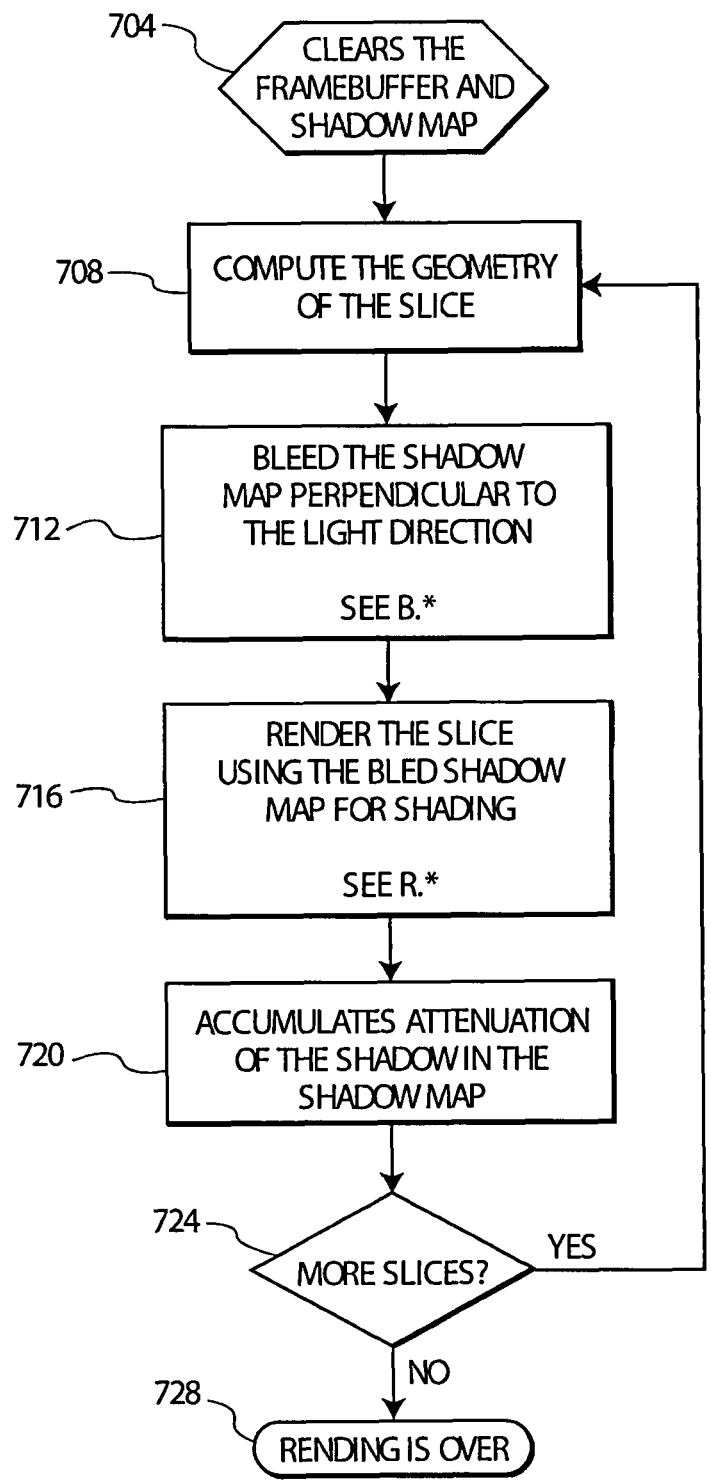
FIG. 7 is a flowchart of the steps performed for the bleeding operation in accordance with an embodiment of the present invention.

FIG. 7 is a flowchart of the steps performed for the bleeding operation to solve the problems of shading with degenerated gradients and to remove the overhead induced by computing gradients in accordance with an embodiment of the present invention. The framebuffer and shadow map are cleared in step 704. The geometry of a slice is then computed in step 708. The computer 102 then bleeds the shadow map perpendicular to the light direction in step 712. The slice is rendered using the bled shadow map for shading in step 716.

The computer 102 then accumulates attenuation of the shadow in the shadow map in step 720 and then determines in step 724 whether there are more slices to render. If not, the rendering is finished in step 728. If there are more slices to render, the process repeats itself by returning to step 708.

Figure 8:
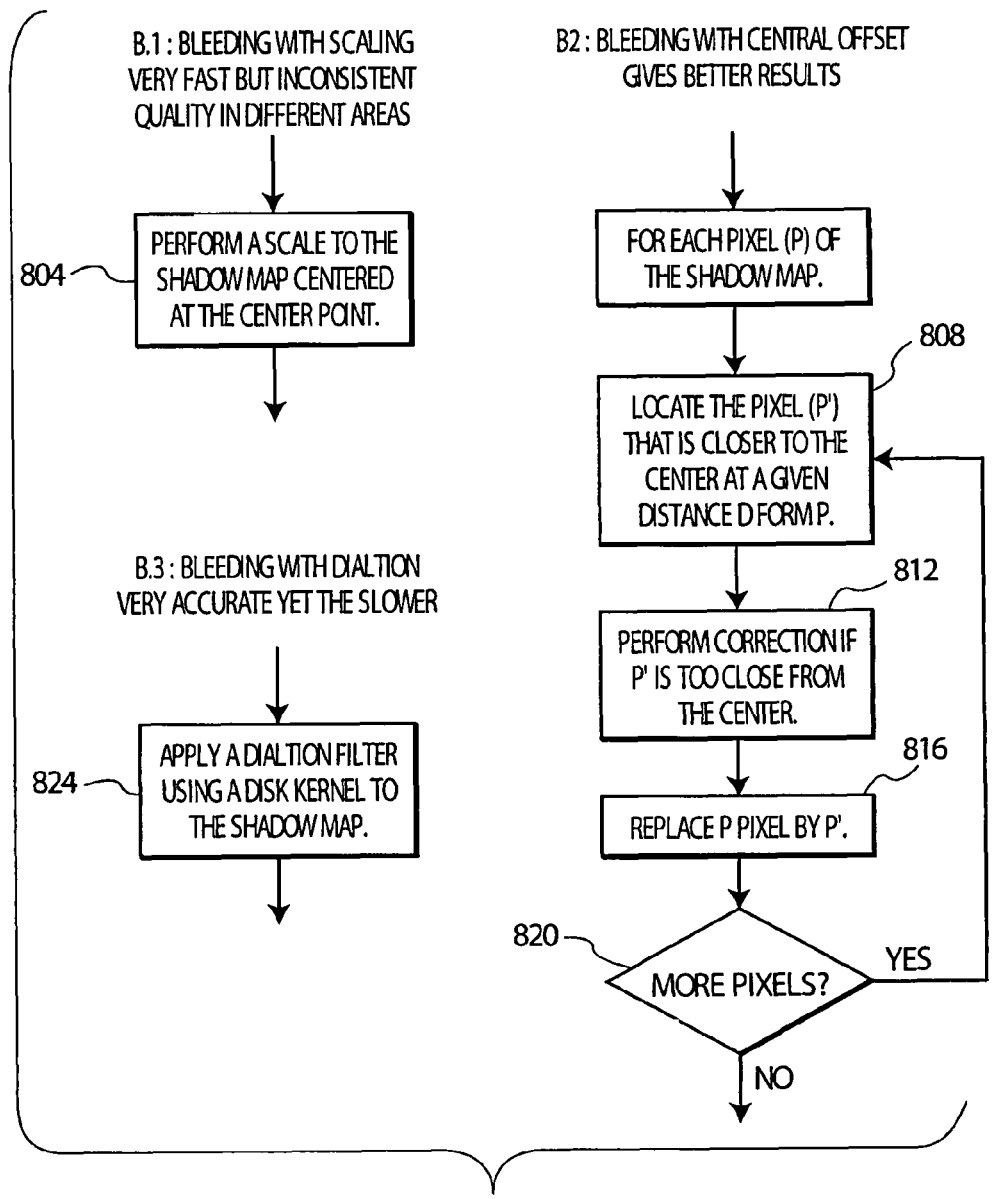
FIG. 8 shows flowcharts providing more details of the bleeding procedure described in FIG. 7 in accordance with an embodiment of the present invention.

FIG. 8 shows flowcharts providing more details of the bleeding procedure described in step 712 of FIG. 7. In particular, three bleeding techniques are shown in FIG. 8. The first bleeding technique can be achieved by slightly scaling the shadow map around its center. Shadowed areas are then 'pushed' toward the borders of the shadow map as shown in step 804. This technique typically executes very quickly but may be inconsistent in different areas. This technique typically works well for somewhat convex objects with boundaries facing away from the center of the volume. This technique does not usually tax graphic hardware, as scaling can be achieved with modified textures coordinates. This technique does, however, sometimes show artifacts in areas that are far from the center of the volume.

The second bleeding technique is bleeding with a central offset. For each pixel (p) of the shadow map, this bleeding technique includes locating the pixel (p') that is closer to the center at a given distance d from pixel p in step 808. The technique then performs a correction if p' is too close from the center in step 812. An example of a correction performed is if the distance to the center of the shadow buffer is smaller than the size of a falloff region ("falloff" parameter), then the translated lookup is multiplied with a correction factor offsetLen/falloff. The pixel p is then replaced by the pixel p' in step 816. If more pixels are in the shadow map (step 820), the process repeats itself by returning to step 808.

The third bleeding technique is bleeding with dilation. This is an accurate procedure but is typically slower than the other procedures. For this procedure, a dilation filter is applied using a disk kernel to the shadow map in step 824.

FIG. 9 shows two series of renderings performed with three different bleeding operations. In particular, FIG. 9(*a*) shows a gradient-based shading and FIG. 9(*b*) shows a dilation-based shading. FIG. 9(*c*) shows central offset shading and FIG. 9(*d*) shows shading using scaling. Gradient-based shading is added for reference. FIGS. 9(*a*)-9(*d*) highlight the differences between the outputs of the various bleeding techniques.

Figure 10A:
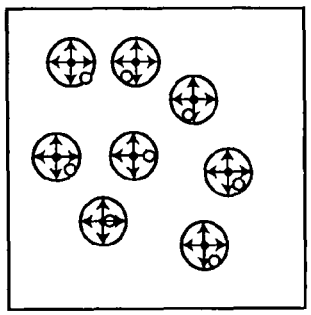
FIG. 10 is a diagram illustrating the dilation, scaling, and central offset bleeding methods in accordance with an embodiment of the present invention.
Figure 10B:
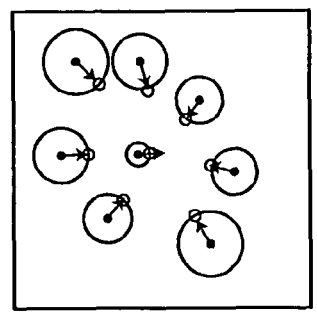
Figure 10C:
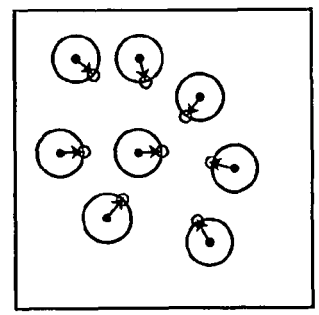

FIG. 10 shows different bleeding methods. FIG. 10(*a*) shows using dilation as a bleeding method. The role of dilation is to bring the light attenuation of the shadow map out of the inner opaque core so it bleeds into the outer shell. The idea of dilation is to perform a local search around the current sampling point to find the minimum shadow value. The behavior of this anisotropic operation is independent of the sampled location, but can be slow. In order to make the bleeding operation faster, the dilation operation is replaced by a scaling operation about the center of the shadow map.

FIG. 10(*b*) shows the scaling bleeding technique. By scaling the shadow map, it is assumed that the position of the darkest neighboring point is always the closest to the center of the image in a local circular area around the sampled texel. A texel is the base unit of textured graphics—graphics that define the surface of three dimensional objects. This works well under the assumption that the rendered surfaces face away from the center of the object. In that condition, texels towards the center of the shadow map will tend to be more attenuated. This assumption can be accepted under certain conditions, because objects we want to visualize are often well centered in the data and the outer isosurface of the volume (the one that is seen) is facing away from the center and thus will be illuminated as expected.

This technique brings down the cost of the bleeding to a single lookup into the shadow map. The scale can be easily included in the projection texture matrix that is used in the vertex program. Though scaling generally works fine compared to dilation from a visual standpoint, in many cases it introduces a major inaccuracy in the bleeding. This is due to the fact that the distance between the current sampling position and the modified sampling position is proportional to the distance of the sampling location and the center.

Consequently, features that are encoded in the middle of the texture will look flat. More significantly, shadows for features located near the volume boundaries will be shifted too much, creating shaded and lighted regions at the wrong locations, which can be unacceptable when using an image for diagnostic purposes. FIG. 9(*d*) shows an example of shading using scaling and illustrates shaded and lighted regions at the wrong locations.

FIG. 10(*c*) shows an illustration of a bleeding method using a central offset. The artifacts can be avoided by instead sampling a single texel at a constant distance from the sampled location towards the center of the map. This technique removes the artifacts of scaling but introduces a new artifact in the middle of the shadow map for positions that are closer to the center than our constant distance. To overcome this, a small falloff distance to the center is defined, where the offset is reduced proportionally to the proximity to the center. FIG. 9(*c*) shows that this corrects the inconsistencies and only affects shading quality very locally. Note that this geometric offset can be performed in real time or can be precomputed and stored in a 2D texture.

The techniques described above provide a gradient-free approximation of diffuse shading, and the balance between performance and accuracy can be tuned by choosing one of the proposed bleeding techniques. This model, however, does not address specular highlights, an important lighting characteristic for shiny materials. A specular term can be approximated by computing the diffuse term and raising it to a power.

Figure 11:
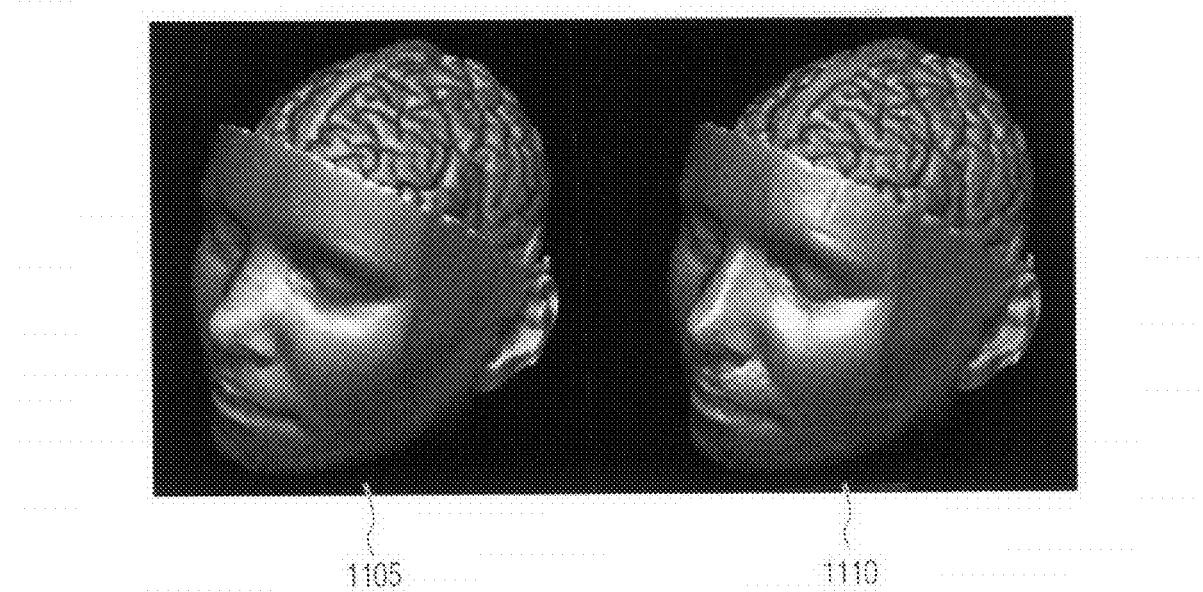
FIG. 11 is an illustration of a first image that uses gradient-free pseudo-specular shading and a second image that uses traditional gradient-based specular shading.

This approximation can be performed at very little cost over the plain diffuse shading, though it assumes that the reflection vector is equal to the surface normal. This is incorrect in the general case and can lead to a wrong placement of highlights but can improve the general perception of shapes through the addition of contrast. FIG. 11 shows a first image 1105 that uses gradient-free pseudo-specular shading. A second image 1110 uses traditional gradient-based specular shading. The gradient-free highlights improve the clarity of the image despite their incorrect placement and inherent softness. An advantage of this technique is that it still doesn't involve gradient computation, resulting in a shading model that has all the terms of Blinn-Phong with shadows at a cost much less than that of classical gradient-based Blinn-Phong shading. The lighting model is then defined as follows:

$$\bar{I} = \bar{c}_{rgb} \times d \times I_d + s \times I_d^n \times \bar{c}_{alpha}$$

In this equation, n is the shininess, d and s are the diffuse and specular intensities, $I_d$ is the diffuse component derived from the shadow bleeding and c is the color from classification.

Note that the specular contribution is multiplied by the transfer function's alpha value because the diffuse term only becomes significant as the light travels into the medium and gets attenuated. If this multiplication did not occur, opaque specular areas would be overpowered.

This approximation results in soft specular highlights, and when the specularity is set to a high value, some bright areas appear on flat surfaces and obscure fine details. Specularity is generally very sensitive to gradient variation, so this technique only provides acceptable results with reasonably low shininess factors, which produces soft and large highlights, as shown in the first image 1105 of FIG. 11.

In some cases, accurate specular highlights are essential in conveying detail. For example, small cracks on bone surfaces or wrinkles on soft tissue can be accentuated by accurate specular highlights. In order to render specular highlights accurately, gradients must be a part of the specular component calculation. Specular highlights are typically a very local phenomenon and assume the following about the volume lighting characteristics:

Specular highlights usually occur in areas that also emit diffuse light

Specular highlights need not be computed in empty or transparent areas.

This means that once the diffuse shading term has been derived from the shadow map and the color is fetched from the transfer function, whether or not a voxel is subject to a specular highlight can be determined based on the following test:

(Diffuse>$k_1$ and Color.alpha>$k_2$)

where $k_1$ and $k_2$ are arbitrary thresholds for the shadow value and the voxel color transparency, respectively. This condition can be evaluated on a per fragment basis and it can be decided whether or not to compute a specular term. If the condition is true, the six 3D lookups required for central-differences gradient computation is performed, the gradient is calculated, and the specular term is computed from the gradient and the halfway vector. Most voxels fail this condition, meaning the specular term and gradient computation can be avoided for the majority of the volume.

To determine the final fragment color, the diffuse term computed without the gradients can be used with the specular term added for selected fragments. The final result is very close to Blinn-Phong shading with added shadows but behaves nicely on cutting planes, by avoiding artifacts in these areas due to diffuse lighting computed from degenerate gradients.

The next step is to override the gradient-free diffuse shading in areas that are selected for gradient computation by the classical dot-product based diffuse term. Although gradients are only computed on the lit surface of the object, the obtained image quality closely matches the results of Blinn-Phong shading with shadows. As the heavy gradient computation is only performed where needed, we can achieve higher frame rates than full Bling-Phong shading. Also note that this technique can be performed with little or no bleeding radius, since shadow attenuation only helps to determine areas where the real diffuse term has to be computed. Thus, the least expensive bleeding method can be used.

Figure 12A:
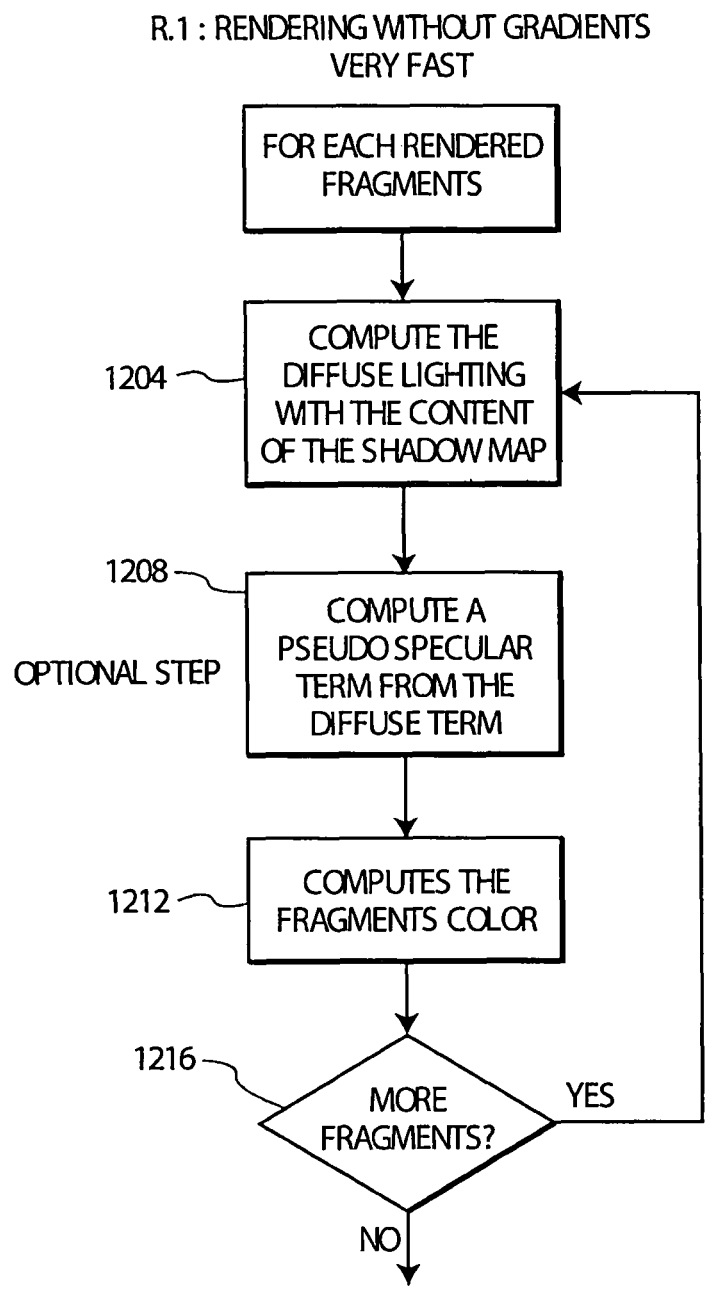
FIG. 12 shows flowcharts for the different methods for rendering slices.

FIG. 12 shows flowcharts for the different methods for rendering slices. FIG. 12(a) shows the steps needed for rendering without gradients. This procedure typically occurs very quickly relative to the other rendering procedures. The following steps apply for each rendered fragment. The diffuse lighting is computed with the content of the shadow map in step 1204. In one embodiment, a pseudo specular term from the diffuse term is computed in step 1208. This can enhance the result with a very low cost and produce readable images without computing any gradients. The fragments color is then computed in step 1212. The method then determines whether there are more fragments in step 1216. If so, the process returns to step 1204.

Figure 12B:
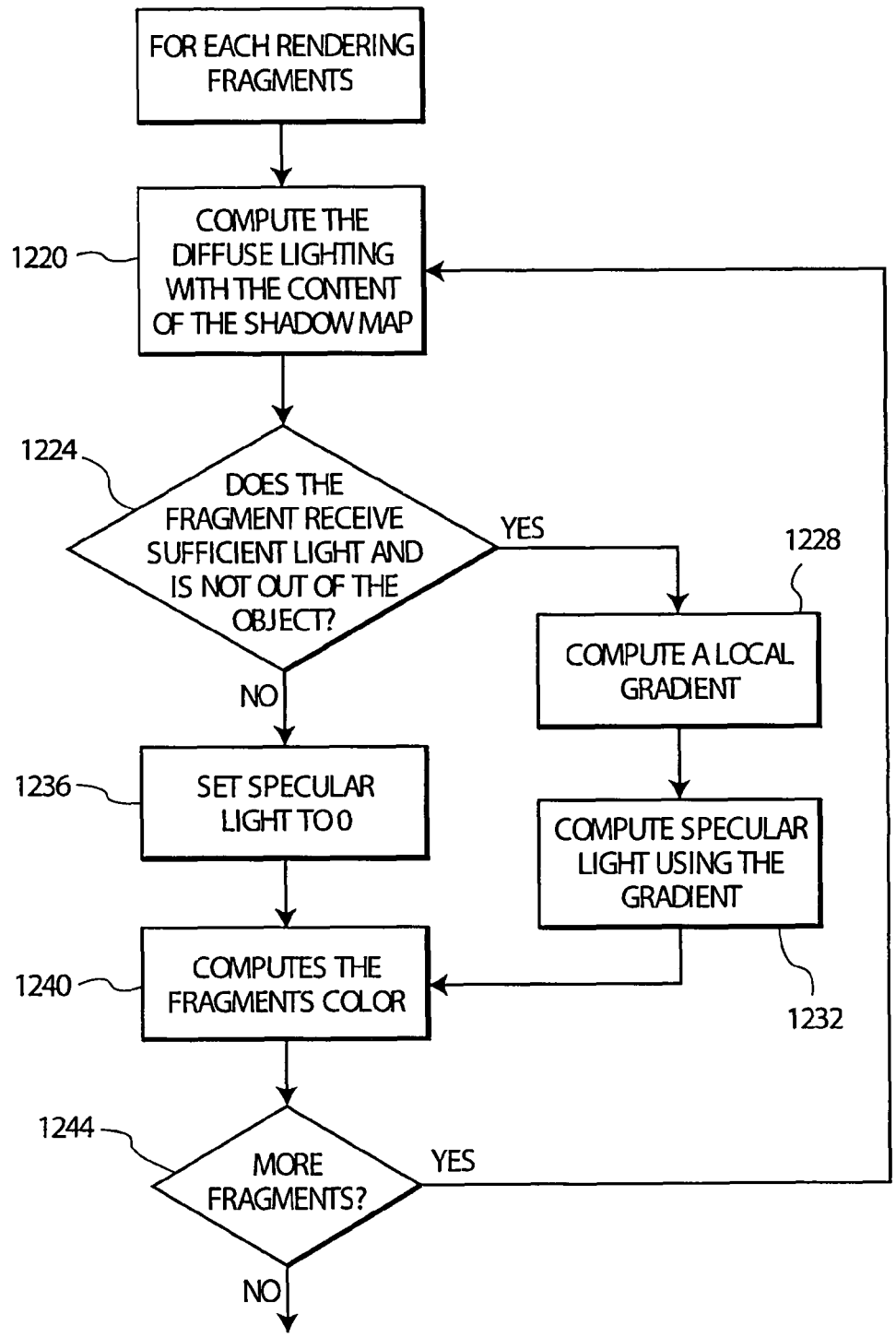

FIG. 12(b) shows the steps needed for rendering with selective specular. This process typically occurs quickly with an accurate specular lighting relative to the other rendering procedures. The following steps apply for each rendered fragment.

The diffuse lighting is computed with the content of the shadow map in step 1220. The computer then determines whether the fragment receives sufficient light and is not out of the object in step 1224. If the fragment does receive sufficient light, a local gradient is computed in step 1228 and a specular light is computed using the gradient in step 1232. If the fragment does not receive sufficient light, the specular light is set to zero in step 1236. The fragment color is then computed in step 1240. If there are more fragments in step 1244, the process repeats itself by returning to step 1220. If not, the process is finished.

Figure 12C:
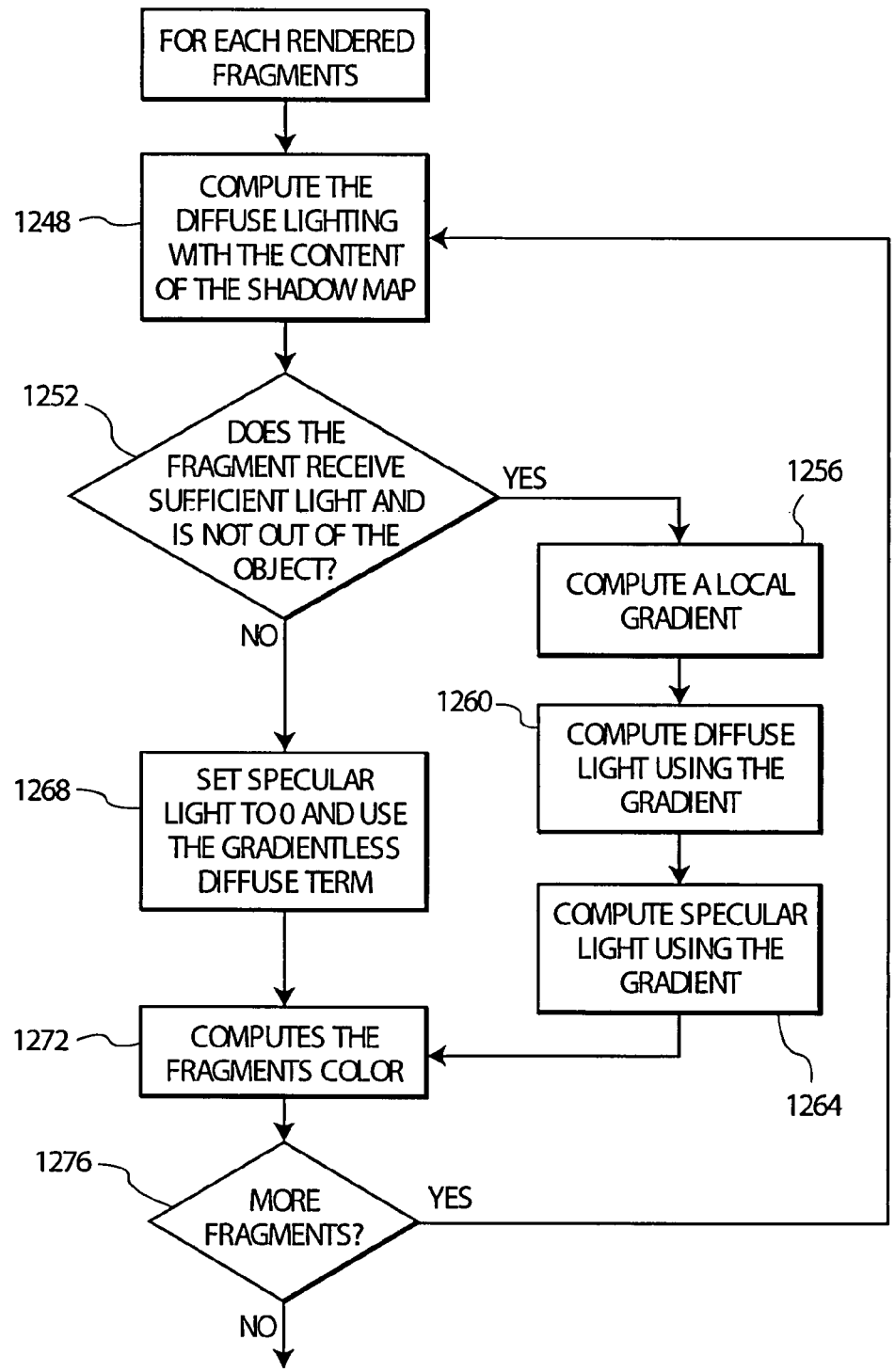

FIG. 12(c) shows the steps needed for rendering with selective Blinn/Phong. This provides the exact same results as the Blinn/Phong method but is typically much faster than the Blinn/Phong method. The following steps apply for each rendered fragment.

The diffuse lighting is computed with the content of the shadow map in step 1248. It is then determined whether the fragment receives sufficient light and is not out of the object in step 1252. If the fragment does receive sufficient light, a local gradient is computed in step 1256. The diffuse light is computed using the gradient in step 1260. The specular light is then computed using the gradient in step 1264. If the fragment does not receive sufficient light, the specular light is set to zero and the gradientless diffuse term is used in step 1268. The fragment color is then computed in step 1272. If there are more fragments in step 1276, the process repeats itself by returning to step 1248. If not, the process is finished.

FIG. 13 is a diagram of a pixel shader code file 1300 in accordance with an embodiment of the present invention. The code file computes the offset direction in step 1304 and then computes the distance to the center in step 1308. The code then removes artifact(s) in the middle in step 1312 and then performs the translated lookup in step 1316.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for computing shading of a volume comprising:
    rendering a slice of said volume along a half-angle direction that is between a light direction and a view direction;
    rendering a slice of said volume along said light direction to assimilate shadow information of said slice in a shadow map; and
    bleeding said shadow map orthogonal to said light direction, without using gradients, to shade said slice by extending a shadow region of an object toward an outside of said object where said shadow region intersects said slice.

2. The method of claim 1 wherein said bleeding said shadow map comprises scaling said shadow map.

3. The method of claim 1 wherein said bleeding said shadow map comprises dilating said shadow map.

4. The method of claim 1 wherein said bleeding said shadow map comprises bleeding with a central offset.

5. The method of claim 4 wherein bleeding with a central offset comprises, for a first pixel of the shadow map, locating a second pixel that is closer to a center point of said shadow map at a given distance from said first pixel.

6. The method of claim 5 further comprising performing a correction if said second pixel is too close to said center point.

7. The method of claim 6 further comprising replacing said first pixel with said second pixel.

8. The method of claim 1 comprising, after said bleeding, rendering said slice using said shadow map.

9. The method of claim 8 wherein said rendering said slice using said shadow map comprises at least one of rendering without gradients, rendering with selective specular lighting, and rendering with selective Blinn/Phong.

10. The method of claim 9 wherein said rendering said slice using said shadow map further comprises computing diffuse lighting with said shadow map.

11. An apparatus for computing shading of a volume comprising:
    means for rendering a slice of said volume along a half-angle direction that is between a light direction and a view direction;
    means for rendering a slice of said volume along said light direction to assimilate shadow information of said slice in a shadow map; and
    means for bleeding said shadow map orthogonal to said light direction, without using gradients, to shade said slice by extending a shadow region of an object toward an outside of said object where said shadow region intersects said slice.

12. The apparatus of claim 11 wherein said means for bleeding said shadow map comprises means for scaling said shadow map.

13. The apparatus of claim 11 wherein said means for bleeding said shadow map comprises means for dilating said shadow map.

14. The apparatus of claim 11 wherein said means for bleeding said shadow map comprises means for bleeding with a central offset.

15. The apparatus of claim 14 wherein means for bleeding with a central offset comprises, for a first pixel of the shadow map, means for locating a second pixel that is closer to a center point of said shadow map at a given distance from said first pixel.

16. The apparatus of claim 15 further comprising means for performing a correction if said second pixel is too close to said center point.

17. The apparatus of claim 16 further comprising means for replacing said first pixel with said second pixel.

18. The apparatus of claim 11 comprising means for rendering said slice using said shadow map.

19. The apparatus of claim 18 wherein said means for rendering said slice using said shadow map further comprises means for computing diffuse lighting with said shadow map.

* * * * *